No. 677,460. Patented July 2, 1901.
A. MIXNER.
PHOTOGRAPHIC MAGAZINE CAMERA.
(Application filed Dec. 5, 1899.)
(No Model.) 3 Sheets—Sheet 3.
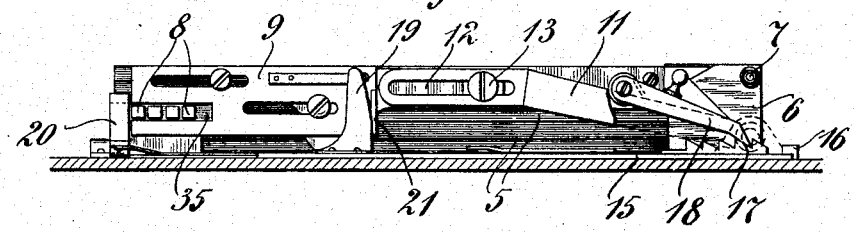
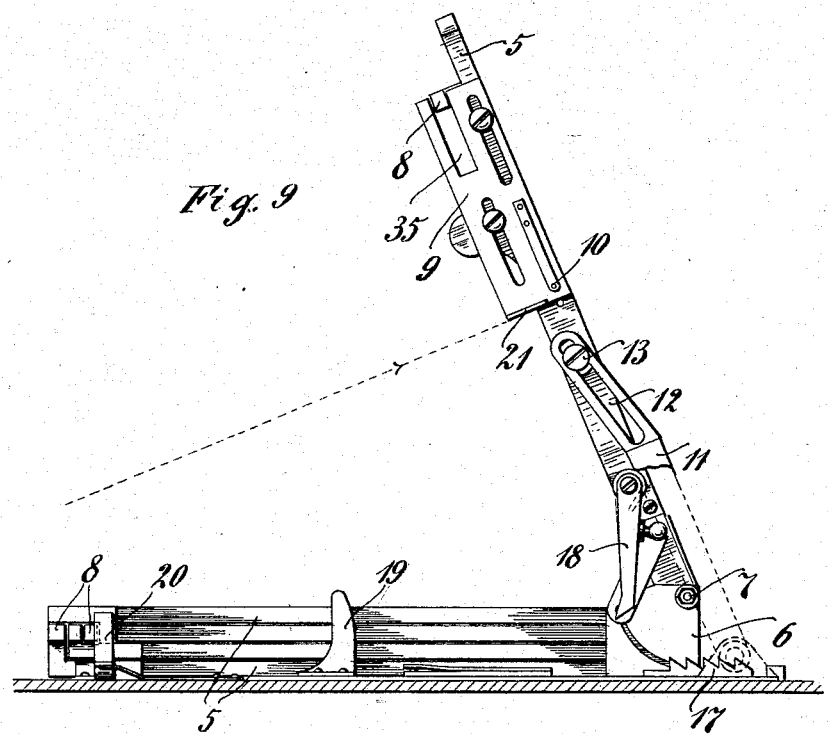
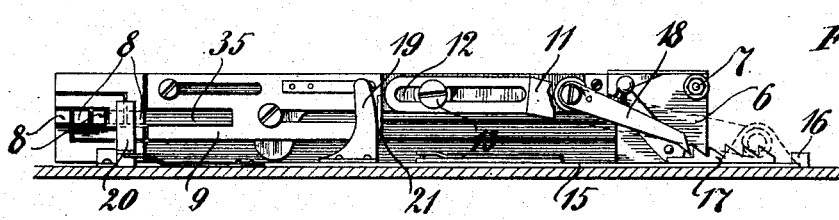

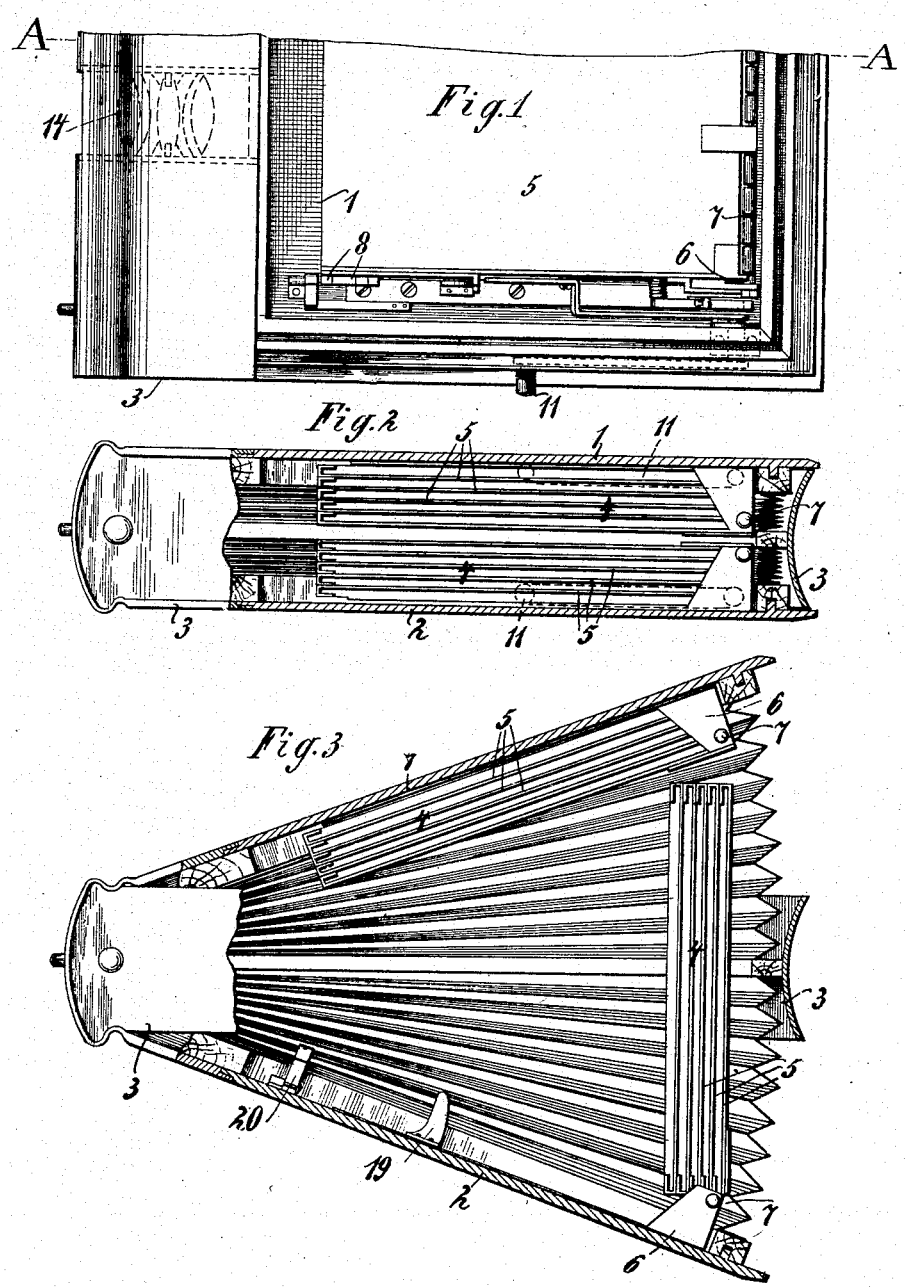

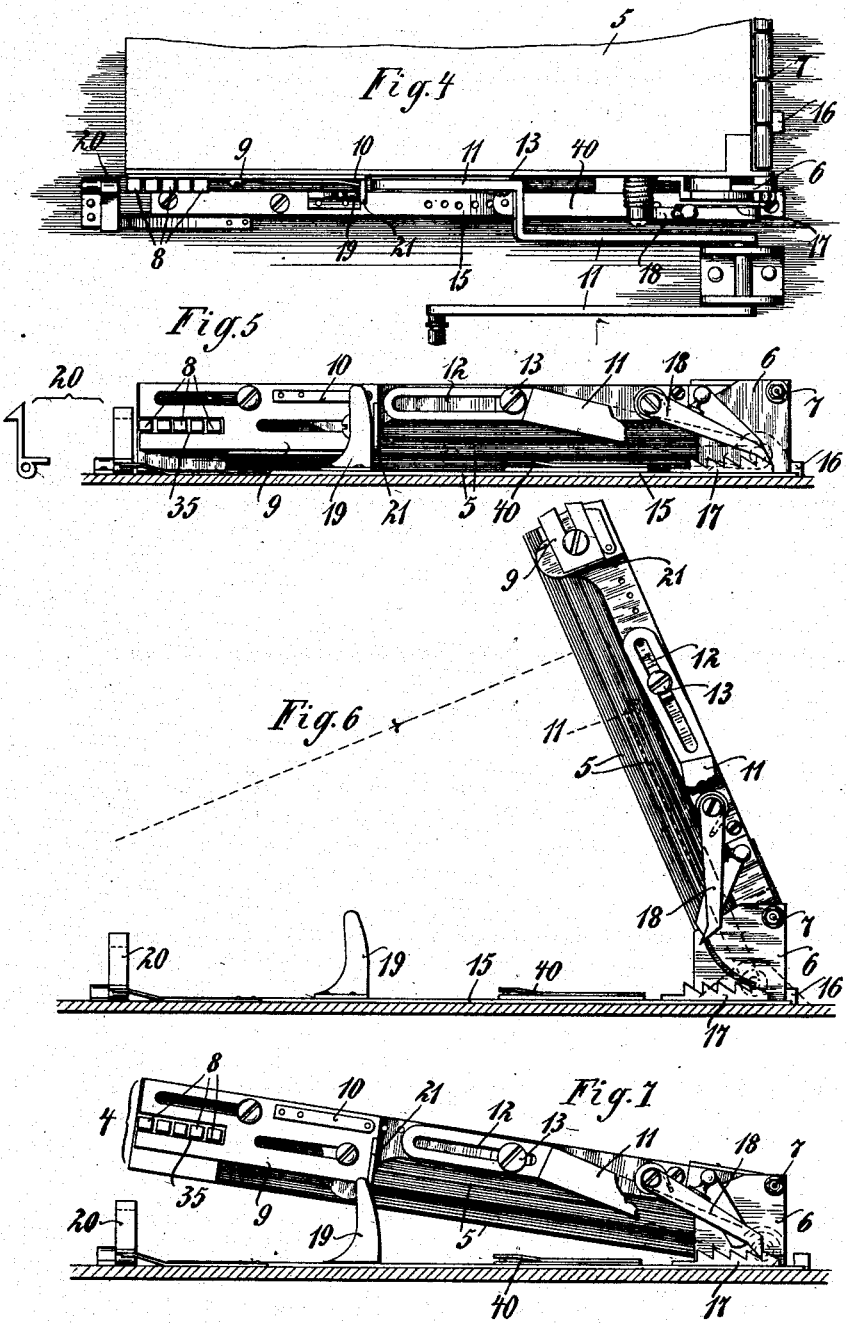

UNITED STATES PATENT OFFICE.

ANDRÉ MIXNER, OF GRAZ, GERMANY, ASSIGNOR TO C. P. GOERZ, OF FRIEDENAU, GERMANY.

PHOTOGRAPHIC MAGAZINE-CAMERA.

SPECIFICATION forming part of Letters Patent No. 677,460, dated July 2, 1901.

Application filed December 5, 1899. Serial No. 739,300. (No model.)

*To all whom it may concern:*

Be it known that I, ANDRÉ MIXNER, a citizen of the Duchy of Steiermark, and a resident of Graz, (whose post-office address is Villefortgasse 5,) in the Duchy of Steiermark, Empire of Austria-Hungary, have invented certain new and useful Improvements in Photographic Magazine-Cameras, of which the following is a specification.

My invention relates to a photographic magazine-camera holding plates or films, the plate or film holders being held in frames hinged to the sides of the camera, this construction insuring great facilities in fixing the plates or films in the focal plane of the camera and in removing the same after exposure.

Further objects and advantages of the invention will appear in the following description of a book-camera built on this system.

In the drawings, Figure 1 is a side view of a camera holding ten plates with the side cover removed. Fig. 2 is a top view of the closed camera with the top cover removed, following line A A' of Fig. 1. Fig. 3 is the same view of the camera opened and ready for the first exposure. Fig. 4 is a side view of the frame and the five plate-holders of one side removed from the camera and showing the controlling device. Fig. 5 is a bottom view of the same with the frame fastened to the side of the camera before any exposure has been made. Fig. 6 shows the same in position for the first exposure. Fig. 7 shows the same after exposure during the turning of the plates out of position. Fig. 8 shows the plate-holder frame fastened to the side of the camera after the first exposure. Fig. 9 is a bottom view of the same parts, four plates having been exposed and the fifth and last ready for exposure. Fig. 10 shows the plates of one side after having been exposed.

Similar characters of reference indicate corresponding parts in all the figures of the drawings.

1 and 2 are the covers of a book-shaped camera, to be opened just like a book and containing fastened between them the light-tight folding chamber, which is inclosed when folded up in a frame 3, representing the paper edges of the book. The back contains the lens and focusing device 14 and the shutter.

Two frames bearing five plate-holders each are hinged to the inner sides of the camera-case, each frame, with its plate-holders, oscillating on an axle 7, common to all of them and fastened to the bottom plate 6 and top plate 4. Each plate-holder bears at the bottom end farthest remote from the hinges a flange 8, the flanges of one set being arranged one near the other in a row. The plate-holders are held close together by means of a slider 9, sliding on the bottom of the frame and bearing an open slot at one end to embrace the flanges 8 of the plate-holders. The slider is held in position by a spring 10, bearing a pin catching in a row of holes in distances corresponding to the breadth of the flanges 8. The plate-holder frame is swung into and out of position by aid of a double-bent lever 11, fastened to the side cover and extending through the bottom of the camera. A finger 20, governed by a spring, is fastened to the camera-case next to the row of flanges 8. To get this finger to retain the plate-holders one after the other by aid of their flanges 8, the frame and the plate-holders are moved a little distance farther toward the finger 20 after the plates have been exposed, thus bringing the latch of the plate-holder in question into contact with the finger. This is effected by aid of a spring-governed trigger 18, fastened to the bottom plate 6 of the frame and catching in a ratch 17, bearing five ratchets. The trigger being pressed against the ratch and the lever 11 embracing with a slot 12 the screw 13, fastened to the bottom plate 6, the trigger catches in the next ratchet each time the plate-holders are swung in again. Thus the frame carrying the plate-holders is driven a little forward. A spring device 40, catching in a row of holes in the side plate 15, prevents this forward movement from being extended too far. A catch 19 serves to prevent the slider 9 from following this movement of the frame 6 by catching its shoulder 21.

To make an exposure, the camera is opened and one of the plate-holder frames swung into position, Figs. 3 and 6, by turning its respective lever 11. After the exposure the plate-holder frame is swung in again by a contrary motion of the lever. The trigger 18 catches in the first ratchet of the ratch 17, Fig. 7, and the closing motion of the frame drives the frame and plate-holders forward by the breadth of one ratchet. The slider 9 being caught by the catch 19 sets free the flange 8 of the plate just exposed, said flange having moved behind the finger 20, Fig. 8. The next time the frame is swung out for an exposure the first plate already exposed is retained by the finger 20, and the second plate is now placed in the focal plane. The closing of the frame brings the next plate-holder's flange behind the finger, and on the frame being swung out a third time plates I and II are retained, and so on. Figs. 9 and 10 show the position of the working parts when the last plate of the set is exposed.

I claim—

1. The combination with a camera-case, of a plurality of plate-holders, and a common axle carrying the plate-holder frames secured to the sides of the camera-case and extending parallel therewith, said plate-holders carrying the unexposed plates resting normally out of exposing position, the motion of said frames being positively controllable from without the case, substantially as described.

2. The combination with a camera-case, of one or two plate-holder frames hinged to the sides of the camera-case, the camera-case having a book-like shape, said case, comprising the folding sides, the bellows and a fixed portion intermediate of the ends of the sides to which each side is hinged, said portion forming the lens-holder, substantially as described.

3. The combination with a camera-case, of one or two plate-holder frames hinged to the sides of the camera-case to move toward and from the same, and a lever extending outside of the case for positively moving the holder carrying the unused plates from the position to one side of the exposing position into exposing position, substantially as described.

4. The combination with a camera-case, of a pivotally-supported plate-holder frame hinged to the sides of the camera-case, means for controlling the motion of said frame from without the case, all of the holders normally occupying a position to one side of the exposing position, and means for retaining some of the plate-holders, while the others are swung out with the frame into exposing position, substantially as described.

5. The combination with a camera-case, of a plurality of plate-holder frames hinged to the sides of the camera-case, means for controlling the motion of said frames from without the case said means comprising a twice-bent crank pivoted to the side and extending through the bottom of the case, said crank being movably fastened to the bottom of the frame, substantially as described.

6. The combination with a camera-case, of a plate-holder frame hinged to the sides of the camera-case, means for controlling the motion of the frame from without the case, plate-holders carried by the frame, projections carried by said holders and means for engaging said projections to retain the holder carrying the used plates out of engagement with said frame, substantially as described.

7. The combination with a camera-case, of a plate-holder frame hinged to the sides of the camera-case, means for controlling the motion of said frame from without the case, plate-holders, projections arranged in a row carried by the same, a slider bearing a shoulder at one and an open slot at the other end, said slot embracing the projections of the plate-holders, substantially as described.

8. The combination with the camera-case, of plate-holder frames hinged to the sides of the camera-case, means for controlling the motion of said frames from without the case, plate-holders, projections carried thereby arranged in a row, and a spring-governed finger to retain the projections that are driven behind it, substantially as described.

9. The combination with a camera-case, of a plate-holder frame hinged to the side of the camera-case, means for controlling the motion of said frame from without the case, plate-holders, projections carried by the same arranged in a row, a spring-governed finger to retain the projections that are driven behind it, means for moving the plate-holder frame toward the finger the breadth of one projection in swinging it in after each exposure, substantially as described.

10. The combination with a camera-case, of a plate-holder frame hinged to the side of the camera-case, means for controlling the motion of said frame from without the case, plate-holders, projections carried thereby arranged in a row, a spring-governed finger retaining the projections that are driven behind it, a ratchet fastened to the camera-case and bearing as many ratchets as there are plate-holders, a spring-governed trigger fastened to the bottom of the frame adapted to catch in said ratchet, whenever the frame is swung against the side of the camera-case, substantially as described.

11. The combination with a camera-case, of a plate-holder frame hinged to the side of the camera-case, means for controlling the motion of said frame from without the case, plate-holders, projections carried thereby arranged in a row, a spring-governed finger retaining the projections that are driven behind it, means for moving the plate-holder frames toward the finger including a flange-embracing slider and a catch for preventing said slider from following the motion of the frame, substantially as described.

In testimony whereof I affix my signature in presence of two witnesses.

ANDRÉ MIXNER.

Witnesses:
GUSTAV STALEN,
KARL AUMALVICZ.